US010782764B2

(12) United States Patent
Rajendiran et al.

(10) Patent No.: US 10,782,764 B2
(45) Date of Patent: Sep. 22, 2020

(54) TECHNIQUES OF EMULATING AN ACPI CONTROLLER ON A SERVICE PROCESSOR

(71) Applicant: American Megatrends International, LLC, Norcross, GA (US)

(72) Inventors: Balaji Nagalingam Rajendiran, Duluth, GA (US); Viswanathan Swaminathan, Suwanee, GA (US); David Wise, Loganville, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 100 days.

(21) Appl. No.: 15/431,037

(22) Filed: Feb. 13, 2017

(65) Prior Publication Data

US 2018/0232183 A1    Aug. 16, 2018

(51) Int. Cl.
*G06F 1/3215* (2019.01)
*G06F 1/3228* (2019.01)
*G06F 1/26* (2006.01)
*G06F 13/24* (2006.01)

(52) U.S. Cl.
CPC ............ *G06F 1/3228* (2013.01); *G06F 1/266* (2013.01); *G06F 1/3215* (2013.01); *G06F 13/24* (2013.01)

(58) Field of Classification Search
USPC .................................................... 710/15–19
See application file for complete search history.

(56) References Cited

U.S. PATENT DOCUMENTS

| | | | | |
|---|---|---|---|---|
| 6,048,306 A * | 4/2000 | Spielberg | ................ | A61F 2/005 128/885 |
| 6,131,131 A * | 10/2000 | Bassman | ............ | G06F 13/4059 710/15 |
| 8,024,499 B1 * | 9/2011 | Aybay | ................... | H04L 12/403 710/46 |
| 2008/0091962 A1 * | 4/2008 | Cepulis | ................ | G06F 1/3203 713/320 |
| 2012/0158890 A1 * | 6/2012 | Jreij | ..................... | G06F 11/0784 709/217 |
| 2012/0166825 A1 * | 6/2012 | Blackburn | ............ | G06F 1/3203 713/310 |
| 2014/0289570 A1 * | 9/2014 | Lewis | ..................... | G06F 11/07 714/43 |
| 2017/0010938 A1 * | 1/2017 | Huang | ................ | G06F 11/1417 |

* cited by examiner

*Primary Examiner* — Ilwoo Park
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes a service processor. The service processor monitors events of one or more ACPI compliant devices of a host of the service processor. The service processor maintains device data associated with the one or more ACPI compliant devices based on the events in a data store of the service processor. The service processor emulates an ACPI controller to monitor a communication channel for detecting one or more ACPI commands from the host. The service processor processes the device data in the data store in response to detecting the one or more ACPI commands on the communication channel.

20 Claims, 4 Drawing Sheets

TECHNIQUES OF EMULATING AN ACPI CONTROLLER ON A SERVICE PROCESSOR

BACKGROUND

Field

The present disclosure relates generally to computer systems, and more particularly, to techniques of emulating an Advanced Configuration and Power Interface (ACPI) controller, by a service processor, to monitor and manage ACPI compliant devices of a host of the service processor.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation, v.2.0, Feb. 12, 2004," which is incorporated herein by reference in its entirety, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the intelligence in the IPMI architecture.

A BMC may require a firmware image to make them operational. Firmware is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. The BMC may be considered as an embedded-system device or a service processor.

In a typical scenario, a server employs an Advanced Configuration and Power Interface (ACPI) controller to monitor all ACPI compliant devices. A basic input/output system (BIOS) or an operating system (OS) of the server may be configured to communicate with the ACPI controller using ACPI transactions. As such, through an ACPI specific communication interface, the BIOS/OS can obtain specific information of an ACPI compliant device.

Adding a physical, dedicated ACPI controller to a server platform may add to the cost of the overall server fabrication. Further, additional work may be required to handle/manage ACPI compliant devices via server BIOS/OS. This is especially true in some architectures or environments, where the management software completely takes over managing the systems. In those cases, the management software may be intelligent enough to communicate with the ACPI compliant devices.

Therefore, there is a need for a mechanism that can reduce the complexity of a server platform with ACPI compliant devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes a service processor. The service processor monitors events of one or more ACPI compliant devices of a host of the service processor. The service processor maintains device data associated with the one or more ACPI compliant devices based on the events in a data store of the service processor. The service processor emulates an ACPI controller to monitor a communication channel for detecting one or more ACPI commands from the host. The service processor processes the device data in the data store in response to detecting the one or more ACPI commands on the communication channel.

DETAILED DESCRIPTION

Figure 1:
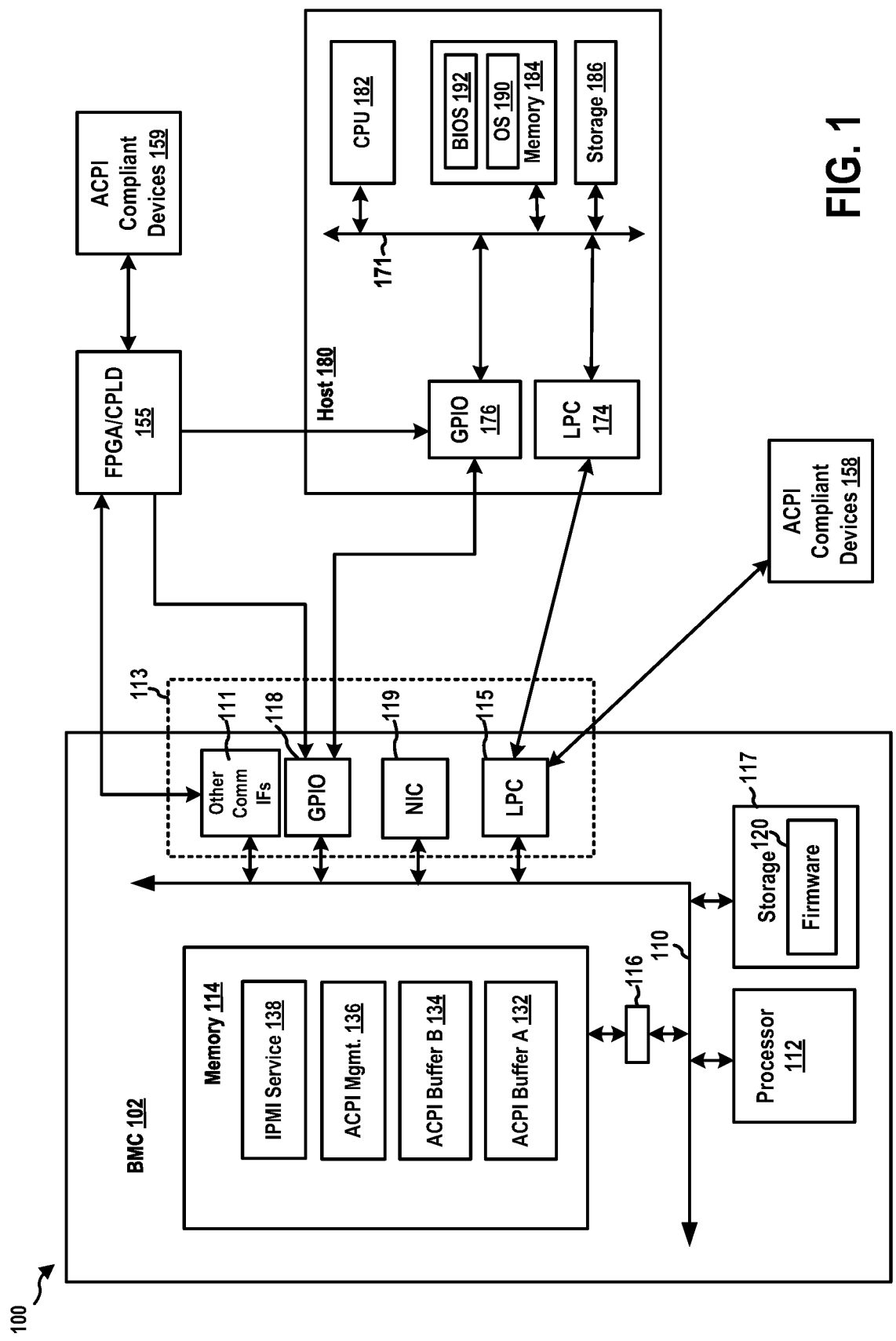
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In a typical scenario, a server employs an ACPI controller to monitor all ACPI compliant devices. A BIOS or OS of the server may be configured to communicate with the ACPI controller using ACPI transactions. As such, through an ACPI specific communication interface, the BIOS/OS can obtain specific information of an ACPI compliant device.

Adding a physical, dedicated ACPI controller to a server platform may add to the cost of the overall server fabrication. Further, additional work may be required to handle/manage ACPI compliant devices via server BIOS/OS. This is especially true in some architectures or environments, where the management software completely takes over managing the systems. In those cases, the management software may be intelligent enough to communicate with the ACPI compliant devices.

Therefore, there is a need for a mechanism that can reduce the complexity of a server platform with ACPI compliant devices. The present disclosure describes that certain management software and/or BIOS/OS are compatible with common BMC communication interfaces such as low pin count (LPC) or I2C. As a BMC is the main management controller of a server platform and may be available for communication even on standby power, the BMC can be conveniently utilized by other components to obtain ACPI related information. Different BMC implementations can provide myriad customizations to manufactures, in terms of filtering out or prioritizing any ACPI transactions depending on platform to platform basis.

FIG. 1 is a diagram 100 illustrating a computer system. In this example, the computer system includes, among other devices, a host computer 180 and a BMC 102. The BMC 102 has a processor 112, a memory 114, a memory driver 116, a storage 117, and communication interfaces such as an LPC interface 115, a network interface card 119, a general-purpose input/output (GPIO) interface 118, and/or other communication interface(s) 111. In certain configurations, one or more of the above components may be implemented as a system-on-a-chip (SoC). For examples, the processor 112, the memory 114, and the storage 117 may be on the same SoC. Further, the BMC 102 may support IPMI and may have an IPMI interface 113. The IPMI interface 113 may be implemented over the LPC interface 115, the network interface card 119, the GPIO interface 118, and/or the communication interface(s) 111. The communication interface(s) 111 may include a keyboard controller style (KCS), a server management interface chip (SMIC), a block transfer (BT) interface, a system management bus system interface (SSIF), a Universal Serial Bus (USB) interface, and/or other suitable communication interface(s). The IPMI service 138 may receive and send IPMI messages through the IPMI interface 113. The memory 114, the processor 112, the memory driver 116, the storage 117, the LPC interface 115, the network interface card 119, the GPIO interface 118, and/or the communication interface(s) 111 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an IPMI service 138 and an ACPI management component 136. Further, the BMC firmware 120 instructs the BMC 102 to allocate, in the memory 114, a reserved memory space for an ACPI buffer A 132 and another reserved memory space for an ACPI buffer B 132.

The BMC 102 may be in communication with the host computer 180 through the LPC interface 115, the network interface card 119, the GPIO interface 118, the communication interface(s) 111, and/or the IPMI interface 113. The BMC 102 may manage the host computer 180. The host computer 180 includes, among other components, a host CPU 182, a host memory 184, a host storage 186, a host LPC interface 174, and a host GPIO interface 176. The host CPU 182, the host GPU 183, the host memory 184, the host storage 186, the host LPC interface 174, and the host GPIO interface 176 may be in communication with each other through a host communication channel 171. The host communication channel 171 may be a bus architecture.

Further, the GPIO interface 118 of the BMC 102 is in communication with the host GPIO interface 176 of the host computer 180 via a communication link. The LPC interface 115 is in communication with the host LPC interface 174 of the host computer 180 via a communication link.

Further, when the host computer 180 is powered on, the host CPU 182 may load a host BIOS 190 from the host storage 186 into the host memory 184 for execution. Subsequently, the host CPU 182 may load a host OS 192 from the host storage 186 into the host memory 184 for execution.

The host computer 180 may also include, among other components, a CPU temperature sensor (not shown) or other sensors (not shown) as well as a CPU fan (not shown) or other hardware components (not shown), which are managed by the BMC 102. The sensors are hardware components and measure operating characteristics such as temperature, current, voltage, power supplies, fans, memory, or any other appropriate operating parameters that affects performance. For instance, the CPU temperature sensor (not shown) monitors the temperature of the host CPU 182. The other sensors (not shown) may monitor voltage levels of the host computer 180, temperature levels for the host computer 180, cooling fan presence and operation, physical hard disk drive presence and operation, and/or errors in memory, etc. Further, the hardware components of the host computer 180 may be operated, e.g., under the management of the BMC 102, to adjust the one or more operating characteristics of the host computer 180. For example, the CPU fan (not shown) may be operated to adjust the temperature of the host CPU 182.

The sensors and the components of the host computer 180 may include ACPI compliant devices 158 and ACPI compliant devices 159. ACPI is an industry specification for the efficient handling of power consumption in desktop and mobile computers. The "Advanced Configuration and Power Interface Specification, Revision 5.0 [Nov. 13, 2013]" is incorporated herein by reference in its entirety. ACPI specifies how a BIOS, an OS, and peripheral devices of a computer system communicate with each other regarding power usage, etc. In this example, the ACPI compliant devices 158 and ACPI compliant devices 159 may include a battery or a power supply unit (PSU).

With ACPI, the user can specify at what time a device, such as a display monitor, is to turn off or on. Further, the user of a notebook computer can specify a lower-level of power consumption when the battery starts running low so that essential applications can still be used while other, less important applications are allowed to become inactive. The OS can lower the clock speed during times when applications do not require the full processor clock speed. The OS can also reduce motherboard and peripheral device power needs by not activating devices until they are needed. The computer can enter a stand-by mode when no one is using it, but with modem power left on to receive incoming faxes. Devices can be plug and play. As soon as plugged in, the device can be controlled in accordance with ACPI.

In this example, ACPI are supported by the computer motherboard, the host BIOS 190, and the host OS 192 of the host computer 180. In particular, the host BIOS 190/OS 192 may send ACPI commands addressed to one of the ACPI compliant devices 158 or the ACPI compliant devices 159 to obtain information of that ACPI compliant device.

The ACPI management component 136 of the BMC 102 can emulate an ACPI controller to monitor and manage the ACPI compliant devices 158 and the ACPI compliant devices 159. The ACPI management component 136 uses the ACPI buffer A 132 and the ACPI buffer B 132 to implement an ACPI memory space (i.e., a data store) to store device data associated with the monitored or managed ACPI compliant devices. As described infra, one of the ACPI buffers A and B 132, 134 stores a current copy of the device data and the other one stores a legacy copy of the device data.

In this example, the BMC 102 is in communication with the ACPI compliant devices 158 through the LPC interface 115. (In other examples, the BMC 102 may be in communication with the ACPI compliant devices 158 through other communication interfaces.) The ACPI management component 136 can poll, through the LPC interface 115, status and data from each of the ACPI compliant devices 158. The ACPI management component 136 can store or update device data associated with the ACPI compliant devices 158 in the ACPI buffers A and B 132, 134. Further, each of the ACPI compliant devices 158 may generate one or more ACPI events and may send those ACPI events on an LPC bus connected to the LPC interface 115. The ACPI management component 136 monitors the LPC interface 115 and, thus, can detect the ACPI events. Based on information contained in an ACPI event, the ACPI management component 136 can store or update, in the ACPI buffers A and B 132, 134, the device data associated with the ACPI compliant device generating the ACPI event.

Further, the BMC 102 may be in communication with a field-programmable gate array (FPGA) or a complex programmable logic device (CPLD) (i.e., an FPGA/CPLD 155) through one of the communication interface(s) 111. The FPGA/CPLD 155 is in communication with the ACPI compliant devices 159, and further controls and/or monitors the ACPI compliant devices 159. The FPGA/CPLD 155 can poll status and data of each of the ACPI compliant devices 159. Further, each of the ACPI compliant devices 159 may generate one or more ACPI events and may send those ACPI events to the FPGA/CPLD 155. Once the FPGA/CPLD 155 has obtained device data of one or more of the ACPI compliant devices 159, the FPGA/CPLD 155 can send an interrupt, e.g., through the GPIO interface 118, to the BMC 102. Upon receiving the interrupt, the ACPI management component 136 can retrieve the device data of the one or more ACPI compliant devices from the FPGA/CPLD 155. Subsequently, the ACPI management component 136 can store the device data of the one or more ACPI compliant devices in the ACPI buffers A and B 132, 134.

Each of the ACPI buffers A and B 132, 134 services identical ACPI addresses and stores a copy of the device data of the ACPI compliant devices 158 and ACPI compliant devices 159. In one example, device data of each of the ACPI compliant devices 158 and the ACPI compliant devices 159 are mapped to a particular ACPI address or a range of ACPI addresses. Accordingly, when the ACPI management component 136 receives device data of a particular ACPI compliant device (e.g., based on an ACPI event), the ACPI management component 136 stores the device data in the ACPI buffer A 132 or the ACPI buffer B 132 at the address reserved for the particular ACPI compliant device as described infra.

As described supra, the ACPI management component 136 may receive an ACPI event generated by the ACPI compliant devices 158 or, via the FPGA/CPLD 155, data of an ACPI event generated by the ACPI compliant devices 159. For example, one device of the ACPI compliant devices 158 or the ACPI compliant devices 159 may be a PSU. The PSU may generate an ACPI event when the PSU is disconnected from a power source or the host computer 180. Another device of the ACPI compliant devices 158 or the ACPI compliant devices 159 may be a battery. The battery may generate an ACPI event when the voltage of the battery is below a predetermined threshold or value.

Upon detecting an ACPI event, the ACPI management component 136 may store or update the device data stored in the ACPI buffers A and B 132, 134 according to the information contained in the ACPI event. In the examples described supra, the ACPI management component 136 may update, in the ACPI buffers A and B 132, 134, the device data associated with the PSU to indicate that the PSU is disconnected and the device data associated with the battery to indicate that the voltage of the battery is below the threshold.

Further, the ACPI management component 136 may decide to notify the host computer 180 regarding the ACPI event. In this example, the BMC 102 may send an interrupt, e.g., through the GPIO interface 118 and host GPIO interface 176, to the host computer 180. In other examples, the ACPI management component 136 may send a message to the host computer 180 through a communication interface between the BMC 102 and the host computer 180.

Further, upon detecting an ACPI event, the FPGA/CPLD 155 may decide to notify the host computer 180 regarding the ACPI event. In this example, the FPGA/CPLD 155 may send an interrupt, e.g., through the host GPIO interface 176, to the host computer 180.

Upon receiving the notification (e.g., the interrupt), the host BIOS 190/OS 192 may send a query command through the host LPC interface 174. The ACPI management component 136 monitors the LPC interface 115, which is connected to the host LPC interface 174 through an LPC bus. Thus, the ACPI management component 136 can receive the query command. Accordingly, the ACPI management component 136 can send to the host BIOS 190/OS 192 a response including the ACPI address of the ACPI compliant device that generated the ACPI event. The host BIOS 190/OS 192 receives the response and learns the ACPI addresses from the response. The host BIOS 190/OS 192 then sends, to the host LPC interface 174, a read command addressed to the ACPI address. The ACPI management component 136 receives the read command through the LPC interface 115 and determines that the ACPI address of the read command is serviced by the ACPI management component 136. The ACPI management component 136 accordingly retrieves the device data stored at the ACPI address in the ACPI buffers A and B 132, 134. The ACPI management component 136 then sends, through the LPC interface 115 and the host LPC interface 174, another response including the retrieved device data to the host BIOS 190/OS 192.

The host BIOS 190/OS 192 may decide to read device data from or write device data to the ACPI controller emulated by the ACPI management component 136. The host BIOS 190/OS 192 may have a map of the ACPI addresses of the ACPI compliant devices 158 and the ACPI compliant devices 159 used by the ACPI buffers A and B 132, 134 to store device data of those ACPI compliant devices.

The host BIOS 190/OS 192 may send, to the host LPC interface 174, a read command addressed to the ACPI address of a particular ACPI compliant device (e.g., the PSU). Upon detecting the read command on the LPC interface 115 and determining that the read command is addressed to an ACPI address serviced by the ACPI management component 136, the ACPI management component 136 then retrieves the device data stored at the address in the ACPI buffers A and B 132, 134. The ACPI management component 136 then sends a response containing the retrieved device data to the host BIOS 190/OS 192.

The host BIOS 190/OS 192 may send, to the host LPC interface 174, a write command addressed to the ACPI address of a particular ACPI compliant device (e.g., the PSU). Upon detecting the write command on the LPC interface 115 and determining that the write command is addressed to an ACPI address serviced by the ACPI management component 136, the ACPI management component 136 then obtains the device data contained in the write command and stores the device data at the address in the ACPI buffers A and B 132, 134.

As described supra, the ACPI management component 136 uses the ACPI buffer A 132 and the ACPI buffer B 132 to implement an ACPI memory space (i.e., a data store) to store device data associated with the monitored or managed ACPI compliant devices. In certain configurations, one of the ACPI buffers A and B 132, 134 stores a current copy of the device data and the other one stores a legacy copy of the device data. Each of the ACPI buffers A and B 132, 134 services identical ACPI addresses and stores a respective copy of device data of the ACPI compliant devices 158 and ACPI compliant devices 159. Data of each of the ACPI compliant devices 158 and the ACPI compliant devices 159 are mapped to a particular ACPI address or a range of ACPI addresses.

When the BMC 102 boots, the ACPI buffers A and B 132, 134 may be empty and do not contain any device data. The ACPI management component 136 can poll each one of the ACPI compliant devices 158 to obtain device data of the ACPI compliant devices 158. The ACPI management component 136 can also instruct the FPGA/CPLD 155 to poll each one of the ACPI compliant devices 158 to obtain device data of the ACPI compliant devices 158. The ACPI management component 136 then can obtain the device data from the FPGA/CPLD 155.

In one example, the ACPI management component 136 may store the device data in the ACPI buffer A 132 and indicates that the ACPI buffer A 132 stores the current copy. Subsequently, the ACPI management component 136 copies the device data from the ACPI buffer A 132 to the ACPI buffer B 132 and accordingly indicates now that the ACPI buffer A 132 stores the legacy copy and the ACPI buffer B 132 stores the current copy. The ACPI management component 136 may store a flag (i.e., a value) for each of the ACPI buffers A and B 132, 134 to indicate whether they respectively store the current copy or the legacy copy.

In certain configurations, the ACPI management component 136 is configured to read from the one of the ACPI buffers A and B 132, 134 that is indicated as storing the current copy and is configured to write to the one of the ACPI buffers A and B 132, 134 that is indicated as storing the legacy copy.

In one example, when the ACPI management component 136 receives from the host BIOS 190/OS 192 a read command for retrieving first data associated with a first ACPI device (e.g., a PSU), the ACPI management component 136 initially determines which one of the ACPI buffers A and B 132, 134 stores the current copy. In this example, the ACPI management component 136 determines that the ACPI buffer B 132 stores the current copy. The ACPI management component 136 retrieves the first data from the ACPI buffer B 132 at the ACPI address indicated by the read command (i.e., the location reserved for the first ACPI device). The ACPI management component 136 then sends the first data to the host computer 180.

Further, in another example, while the ACPI management component 136 is responding to the read command from the host BIOS 190/OS 192 as described supra, the ACPI management component 136 may also detect an ACPI event generated by the first ACPI device. While the ACPI management component 136 is retrieving the first data from the ACPI buffer B 132, which is indicated as storing the current copy, the ACPI management component 136 can concurrently write updated first data from the ACPI event to the ACPI buffer A 132, which is indicated as storing the legacy copy.

Upon completing storing the updated first data in the ACPI buffer A 132, in a protected transaction (e.g., by mutual exclusion or Mutex), the ACPI management component 136 copies some or all of the device data from the ACPI buffer A 132 to the ACPI buffer B 132. This, the data stored at a particular ACPI address in the ACPI buffer B 132 are replaced by the data stored at the same ACPI address in the ACPI buffer A 132. The ACPI management component 136 also indicates, e.g., by updating the flags, that now the ACPI buffer A 132 stores the current copy and the ACPI buffer B 132 stores the legacy copy.

In another example, when the ACPI management component 136 receives from the host BIOS 190/OS 192 a write command for storing second data associated with a second ACPI device (e.g., a battery), the ACPI management component 136 initially determines which one of the ACPI buffers A and B 132, 134 stores the legacy copy. In this example, the ACPI management component 136 determines that the ACPI buffer A 132 stores the legacy copy. Accordingly, the ACPI management component 136 stores, in the ACPI buffer A 132, the second data contained in the write command at the address indicated by the write command (i.e., a location reserved for the second ACPI device).

Subsequently, upon completing storing the second data in the ACPI buffer A 132, in a protected transaction (e.g., by mutual exclusion or Mutex), the ACPI management component 136 copies some or all of the device data from the ACPI buffer A 132 to the ACPI buffer B 132. This, the data stored at a particular ACPI address in the ACPI buffer B 132 are replaced by the data stored at the same ACPI address in the ACPI buffer A 132. The ACPI management component 136 also indicates, e.g., by updating the flags, that now the ACPI buffer A 132 stores the current copy and the ACPI buffer B 132 stores the legacy copy.

In certain circumstances, while the ACPI management component 136 is responding to the write command from the host BIOS 190/OS 192 as described supra, the ACPI management component 136 may also decide to retrieve device data from the ACPI buffers A and B 132, 134. The ACPI management component 136 may be configured to retrieve the device data from the one of ACPI buffers A and B 132, 134 that is indicated as storing the current copy.

In certain circumstances, while the ACPI management component 136 is responding to the write command from the host BIOS 190/OS 192 as described supra, the ACPI management component 136 may also detect an ACPI event generated by the first ACPI device. That is, while the ACPI management component 136 is storing, in the ACPI buffer A 132, the second data contained in the write command at the address indicated by the write command (i.e., a location reserved for the second ACPI device), the ACPI management component 136 may also detect an ACPI event generated by the first ACPI device. The ACPI management component 136 can concurrently store the updated first data from the ACPI event in the ACPI buffer A 132 at the location reserved for the first ACPI device. That is, the ACPI management component 136 can concurrently storing first data and second data at different locations of the ACPI buffer A 132.

Upon completing storing the first and second data in the ACPI buffer A 132, in a protected transaction (e.g., by mutual exclusion or Mutex), the ACPI management component 136 copies some or all of the device data from the ACPI buffer A 132 to the ACPI buffer B 132. This, the data stored at a particular ACPI address in the ACPI buffer B 132 are replaced by the data stored at the same ACPI address in the ACPI buffer A 132. The ACPI management component 136 also indicates, e.g., by updating the flags, that now the ACPI buffer A 132 stores the current copy and the ACPI buffer B 132 stores the legacy copy.

In certain circumstances, while the ACPI management component 136 is responding to the write command from the host BIOS 190/OS 192 as described supra, the ACPI management component 136 may also detect an ACPI event generated by the second ACPI device. That is, while the ACPI management component 136 is storing, in the ACPI buffer A 132, the second data contained in the write command at the address indicated by the write command (i.e., a location reserved for the second ACPI device), the ACPI management component 136 may also detect an ACPI event generated by the second ACPI device. The ACPI management component 136 can execute the write operation based on the write command from the host BIOS 190/OS 192 in a protected transaction (e.g., by mutual exclusion or Mutex). As such, the ACPI management component 136 cannot execute the write operation based on the ACPI event generated by the second ACPI device while the other, protected write operation is being executed. Accordingly, the ACPI management component 136 postpones execution of the write operation based on the ACPI event.

Subsequently, upon completing storing the second data in the ACPI buffer A 132 based on the write command from the host BIOS 190/OS 192, in another protected transaction (e.g., by mutual exclusion or Mutex), the ACPI management component 136 copies some or all of the device data from the ACPI buffer A 132 to the ACPI buffer B 132. This, the data stored at a particular ACPI address in the ACPI buffer B 132 are replaced by the data stored at the same ACPI address in the ACPI buffer A 132. The ACPI management component 136 also indicates, e.g., by updating the flags, that now the ACPI buffer A 132 stores the current copy and the ACPI buffer B 132 stores the legacy copy.

Subsequently, the ACPI management component 136 determines that it can now execute the write operation based on the ACPI event generated by the second ACPI device. The ACPI management component 136 further determines that the ACPI buffer B 132 stores the legacy copy. In another protected transaction (e.g., by mutual exclusion or Mutex), the ACPI management component 136 stores the updated second data from the ACPI event in the ACPI buffer B 132 at the location reserved for the second ACPI device.

Upon completing storing the second data in the ACPI buffer B 132 based on the ACPI event generated by the second ACPI device, in another protected transaction (e.g., by mutual exclusion or Mutex), the ACPI management component 136 copies some or all of the device data from the ACPI buffer B 132 to the ACPI buffer A 132. This, the data stored at a particular ACPI address in the ACPI buffer A 132 are replaced by the data stored at the same ACPI address in the ACPI buffer B 132. The ACPI management component 136 also indicates, e.g., by updating the flags, that now the ACPI buffer A 132 stores the legacy copy and the ACPI buffer B 132 stores the current copy.

These techniques described in this disclosure may reduce the overall cost of the manufacturing process, as the functionality of an ACPI controller can be implemented by a service processor. The service processor (e.g., a BMC) may be alive at all times inclusive of standby state. Thus, other components can read the ACPI information at all times with minimal to almost no lag via the service processor. The BMC caches the device data that are sent to the BMC. Caching the device data in the service processor may help in avoiding delays when the host is requesting for the device data.

The techniques as described supra may also help recover the device data in case of buffer corruption. Typical a service processor already communicates with BIOS for upgrades and other information exchange. The same communication channel can be used for exchanging the ACPI information with the BIOS when needed. This may avoid the need for implementing any ACPI device specific interface communication channel in the OS/BIOS. The techniques provide the flexibility for the manufactures to filter out unnecessary ACPI transactions from reaching the OS/BIOS. The service processor may be easily customized to filter out any commands that a manufacture feels not necessary or incompatible for the platform. The techniques may reduce unnecessary handling of ACPI transactions between the two components.

The service processor may provide remote management capability, including reading sensors and other component information. This can be used to fetch other ACPI compatible device information for a remote user via commands.

Figure 2:
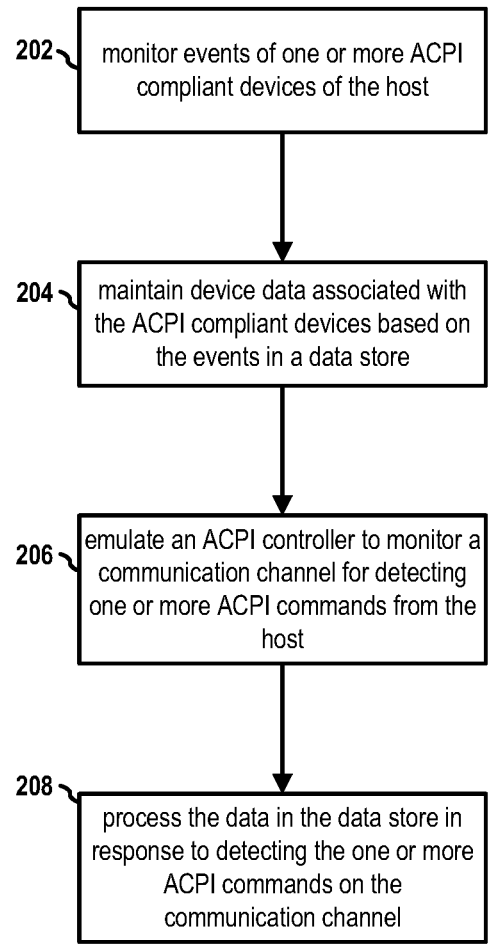
FIG. 2 is a flow chart of a method (process) for operating a service processor.

FIG. 2 is a flow chart 200 of a method (process) for operating a service processor. The service processor may be a BMC (e.g., the BMC 102 and the apparatus 102' of FIG. 3). The service processor manages a host (e.g., the host computer 180).

At operation 202, the service processor monitors events of one or more ACPI compliant devices (e.g., the ACPI compliant devices 158 and the ACPI compliant devices 159) of the host.

At operation 204, the service processor maintains device data associated with the one or more ACPI compliant devices based on the events in a data store (e.g., the ACPI buffers A and B 132, 134) of the service processor.

At operation 206, the service processor emulates an ACPI controller (e.g., the ACPI management component 136) to monitor a communication channel (e.g., an LPC bus connected to the LPC interface 115) for detecting one or more ACPI commands (e.g., a query command, a read command, and a write command) from the host.

At operation 208, the service processor processes the device data in the data store in response to detecting the one or more ACPI commands on the communication channel.

Figure 3:
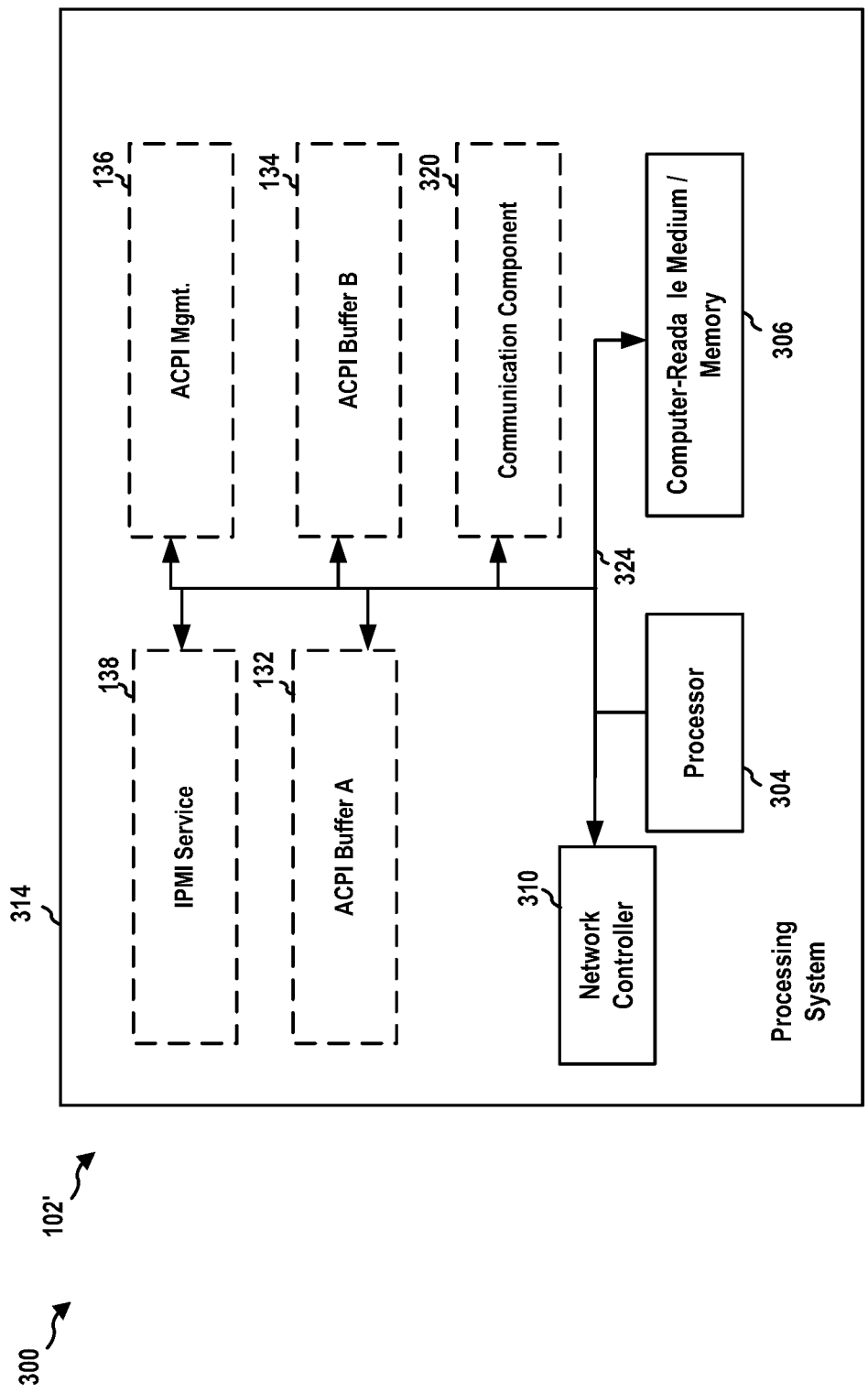
FIG. 3 is a diagram illustrating an example of a hardware implementation for an apparatus employing a processing system.

FIG. 3 is a diagram 300 illustrating an example of a hardware implementation for an apparatus 102' employing a processing system 314. The apparatus 102' may implement the BMC 102. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by a processor 304, a network controller 310, and a computer-readable medium/memory 306. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to the network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the ACPI buffer A 132, the ACPI buffer B 132, the ACPI management component 136, the IPMI service 138. The components may be software components running in the processor 304, resident/stored in the computer readable medium/memory 306, one or more hardware components coupled to the processor 304, or some combination thereof.

The apparatus 102' may be configured to include means for performing operations described supra referring to FIG. 12. The aforementioned means may be one or more of the aforementioned components of the apparatus 102 and/or the processing system 314 of the apparatus 102' configured to perform the functions recited by the aforementioned means.

Figure 4:
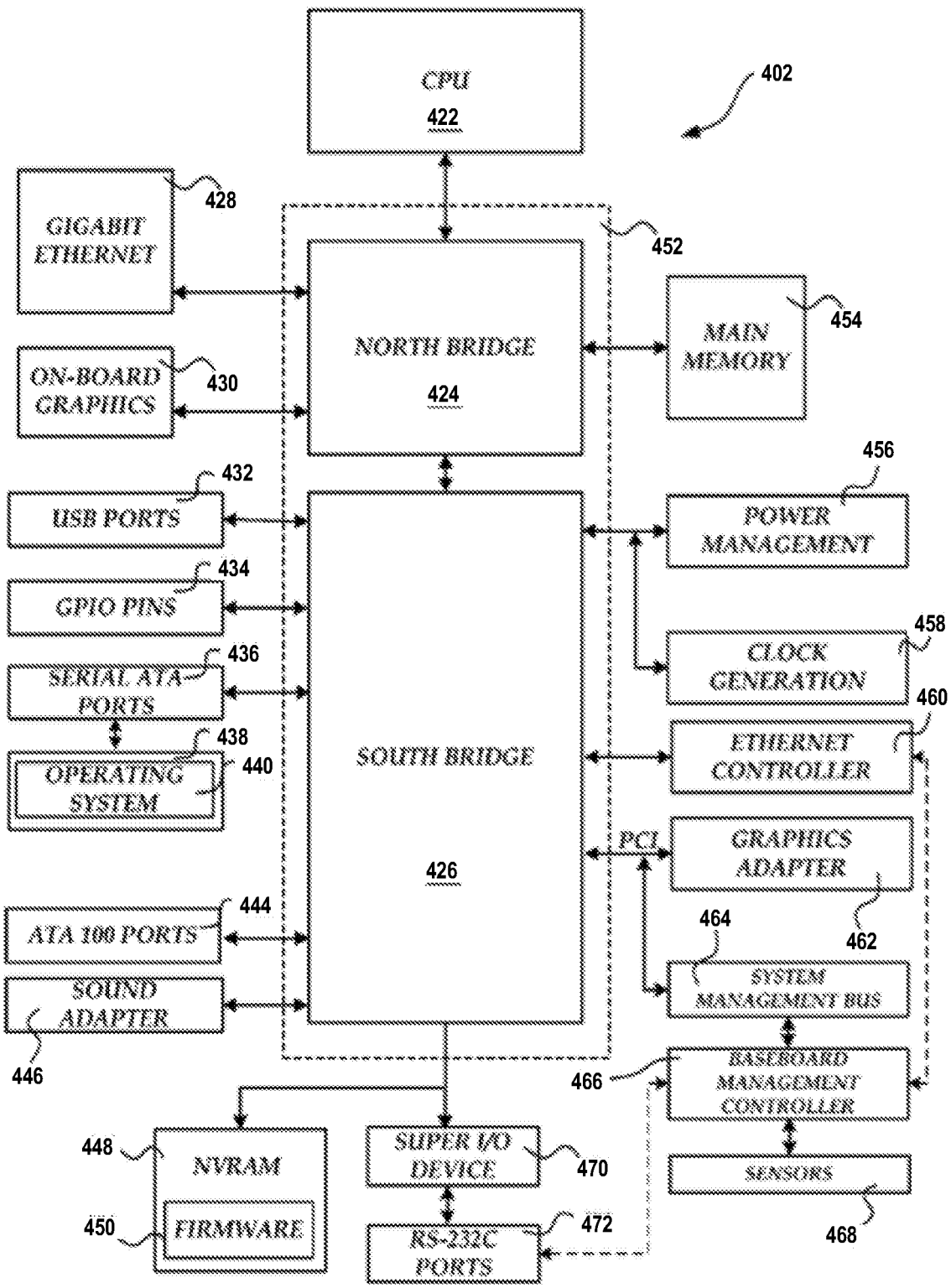
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 180, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count (LPC) interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system including a service processor, comprising:

executing, at a processing unit of the service processor, a first set of instructions to emulate, at the service processor, an ACPI controller, the emulated ACPI controller monitoring, at the service processor and on a first communication channel, one or more Advanced Configuration and Power Interface (ACPI) events generated by one or more ACPI compliant devices of a host of the service processor, the first communication channel supporting communications in accordance with the Advanced Configuration and Power Interface Specification;

executing, at the processing unit of the service processor, a second set of instructions to implement a baseboard management controller (BMC) in compliance with Intelligent Platform Management Interface (IPMI) standards;

detecting, at a programmable logic device managing the one or more ACPI compliant devices, the one or more ACPI events;

sending, at the programmable logic device, a first notification to the service processor in response to detecting the one or more ACPI events;

retrieving, by the ACPI controller in response to receiving the first notification, the one or more ACPI events through the first communication channel;

updating, at the service processor, device data associated with the one or more ACPI compliant devices based on the one or more ACPI events in a data store of the service processor;

sending, at the programmable logic device, a second notification to the host in response to detecting the one or more ACPI events;

receiving, at the service processor, a query command sent by the host through a second communication channel other than the first communication channel in response to receiving the second notification, wherein the second communication channel is also utilized by the BMC for communication between the BMC and the host in accordance with a BMC management function;

sending, at the service processor and to the host, an ACPI address for locating first data associated with a first ACPI device in the data store through the second communication channel; and receiving, at the service processor, a read command sent from the host indicating the ACPI address for retrieving first data associated with a first ACPI device.

2. The method of claim 1, further comprising:
determining, at the service processor, that a first event of the one or more ACPI events occurred at the first ACPI device; and
storing, at the service processor, the first data in the data store.

3. The method of claim 2, further comprising:
detecting, at the programmable logic device, the first event occurred at the first ACPI device; and
sending, at the programmable logic device and to the service processor, an interrupt, wherein the first event is determined by the service processor based on the interrupt.

4. The method of claim 2, wherein the second notification is an interrupt to the host.

5. The method of claim 4, wherein the computer system further comprises the host, the method further comprising:
sending, at the host and to the service processor, the query command in response to receiving the interrupt.

6. The method of claim 1, further comprising:
retrieving, at the service processor, the first data from a location at the ACPI address in the data store reserved for the first ACPI device; and
sending, at the service processor, to the host, the first data.

7. The method of claim 6, wherein the data store includes a first memory space and a second memory space, wherein one of the first and second memory spaces stores a current copy of the device data and the other one of the first and second memory spaces stores a legacy copy of the device data, wherein the first data is retrieved from the one of the first and second memory spaces storing the current copy.

8. The method of claim 7, wherein the second memory space stores the current copy, wherein the first data is retrieved from the second memory space.

9. The method of claim 8, wherein the first memory space stores the legacy copy, the method further comprising:
determining to update first data;
storing updated first data in the first memory space while the first data is being retrieved from the second memory space; and
copying the device data from the first memory space to the second memory space and indicating that the first memory space stores the current copy and the second memory space stores the legacy copy.

10. The method of claim 1, wherein the data store includes a first memory space and a second memory space, wherein one of the first and second memory spaces stores a current copy of the device data and the other one of the first and second memory spaces stores a legacy copy of the device data, the method further comprising:
acquiring, after the service processor is booted, the device data from the one or more ACPI compliant devices;
storing the device data in the first memory space and indicating that the first memory space stores the current copy; and
copying the device data from the first memory space to the second memory space and indicating that the first memory space stores the legacy copy and the second memory space stores the current copy.

11. The method of claim 1, further comprising:
receiving, from the host, a write command for storing second data associated with a second ACPI device; and
storing the second data at a location in the data store reserved for the second ACPI device.

12. The method of claim 11, wherein the data store includes a first memory space and a second memory space, wherein one of the first and second memory spaces stores a current copy of the device data and the other one of the first and second memory spaces stores a legacy copy of the device data, wherein the second data is stored in the one of the first and second memory spaces storing the legacy copy.

13. The method of claim 12, wherein the first memory space stores the legacy copy, wherein the second data are stored in the first memory space, the method further comprising:
copying the device data from the first memory space to the second memory space and indicating that the first memory space stores the current copy and the second memory space stores the legacy copy.

14. The method of claim 13, further comprising:
determining to update the first data; and
storing updated first data in the first memory space while the second data are being stored in the first memory space.

15. The method of claim 13, further comprising:
determining to update the second data; and
determining that the second data is being stored in the first memory space;
waiting until the storing second data in the first memory space is complete; and
subsequent to that the device data is copied from the first memory space and the second memory space is indicated as storing the legacy copy, storing updated second data to the second memory space.

16. A computer system, comprising:
a service processor including:
a memory; and
at least one processor coupled to the memory and configured to:
execute a first set of instructions to emulate, at the service processor, an ACPI controller, the emulated ACPI controller monitoring, at the service processor and on a first communication channel, one or more Advanced Configuration and Power Interface (ACPI) events generated by one or more ACPI compliant devices of a host of the service processor, the first communication channel supporting communications in accordance with the Advanced Configuration and Power Interface Specification;
execute a second set of instructions to implement a baseboard management controller (BMC) in compliance with Intelligent Platform Management Interface (IPMI) standards;
detect, at a programmable logic device managing the one or more ACPI compliant devices, the one or more ACPI events;
send, at the programmable logic device, a first notification to the service processor in response to detecting the one or more ACPI events;
retrieve, at the ACPI controller, the one or more ACPI events through the first communication channel;
update device data associated with the one or more ACPI compliant devices based on the one or more ACPI events in a data store of the service processor;
send, at the programmable logic device, a second notification to the host in response to detecting the one or more ACPI events;
receive, at the service processor, a query command sent by the host through a second communication channel other than the first communication channel in response to receiving the second notification, wherein the second communication channel is also utilized by the BMC for communication between the BMC and the host in accordance with a BMC management function;
send, at the service processor and to the host, an ACPI address for locating first data associated with a first ACPI device in the data store through the second communication channel; and
receive, at the service processor, a read command sent from the host indicating the ACPI address for retrieving first data associated with a first ACPI device.

17. The computer system of claim 16, wherein the at least one processor is further configured to:
determine that a first event of the one or more ACPI events occurred at the first ACPI device; and
store the first data in the data store.

18. The computer system of claim 17, wherein to detect the one or more ACPI events and to update the device data, the programmable logic device is configured to:
detect the first event occurred at the first ACPI device; and
send an interrupt to the service processor, wherein the first event is determined by the service processor based on the interrupt.

19. The computer system of claim 17, wherein the second notification is an interrupt to the host, the at least one processor is further configured to send an interrupt to the host.

20. A non-transitory computer-readable medium storing computer executable code for operating a service processor, comprising code, when executed on a processing unit of the service processor, to:
emulate, at the service processor, an ACPI controller, the emulated ACPI controller monitoring, at the service processor and on a first communication channel, one or more Advanced Configuration and Power Interface (ACPI) events generated by one or more ACPI compliant devices of a host of the service processor, the first communication channel supporting communications in accordance with the Advanced Configuration and Power Interface Specification;
implement a baseboard management controller (BMC) in compliance with Intelligent Platform Management Interface (IPMI) standards;
detect, at a programmable logic device managing the one or more ACPI compliant devices, the one or more ACPI events;
send, at the programmable logic device, a first notification to the service processor in response to detecting the one or more ACPI events;
detect, at the ACPI controller, the one or more ACPI events through the first communication channel;
update device data associated with the one or more ACPI compliant devices based on the one or more ACPI events in a data store of the service processor;
notify the host through a second communication channel other than the first communication channel;
receive, at the service processor, a query command from the host through a second communication channel other than the first communication channel in response to the notification, wherein the second communication channel is also utilized by the BMC for communication between the BMC and the host in accordance with a BMC management function;
send, at the service processor and to the host, an indication for locating first data associated with a first ACPI device in the data store through the second communication channel; and receive, at the service processor, a read command sent from the host indicating the ACPI address for retrieving first data associated with a first ACPI device.

\* \* \* \* \*